(No Model.)
J. B. EADS.
SHIP RAILWAY AND DRY DOCK.
No. 258,727. Patented May 30, 1882.
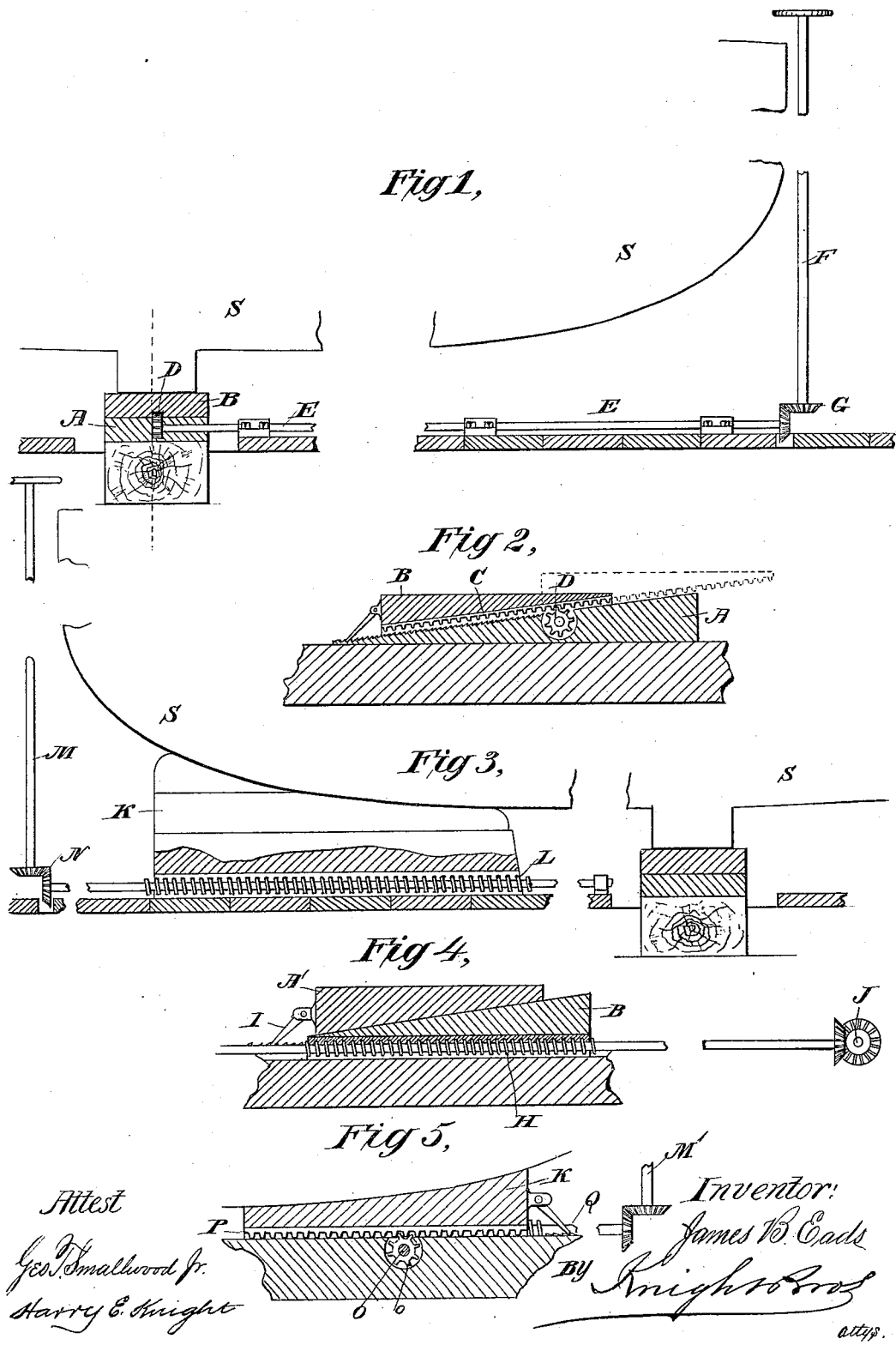

UNITED STATES PATENT OFFICE.

JAMES B. EADS, OF ST. LOUIS, MISSOURI.

SHIP-RAILWAY AND DRY-DOCK.

SPECIFICATION forming part of Letters Patent No. 258,727, dated May 30, 1882.

Application filed January 7, 1881. (No model.)

*To all whom it may concern:*

Be it known that I, JAMES B. EADS, a citizen of the United States, residing at St. Louis, in the State of Missouri, have invented Improvements in Ship-Railways and Dry-Docks, of which the following is a specification.

My invention relates to a system of ships' cradles applicable to drydocking vessels for repairs and for all purposes, but especially designed for supporting vessels on trucks by means of which they may be conveyed over land from one navigable water to another. Improvements in railway cars and trucks suitable for the purpose I have described in an earlier application for Letters Patent.

My present improvement particularly relates to a system of wedges or chocks operated by screws, racks, and pinions, and positive mechanical means, by which a uniform support is afforded to all parts of a ship's bottom, so as to avoid injurious strains.

In the accompanying drawings, Figure 1 is a partial transverse section, illustrating a mode of operating the keel-blocks by means of racks and pinions. Fig. 2 is a partial longitudinal section of the same device. Fig. 3 is a partial transverse section, illustrating a mode of operating the bilge-blocks by screw-gearing. Fig. 4 is a partial longitudinal section, showing a keel-block operated by a screw. Fig. 5 is a partial transverse section, showing a bilge-block operated by rack and pinion.

Parts of a vessel are shown at S S, resting on wedge-shaped chocks A B, which are arranged within a cradle of usual or any suitable construction. In Figs. 1 and 2 the blocks or chocks A are supposed to be stationary, having inclined upper surfaces, on which the wedge-shaped chocks B are moved by racks C and pinions D, the latter being keyed on horizontal shafts E, rotated by vertical shafts F through the medium of beveled pinions G. The vertical shafts F are extended to the upper part of the cradle, where they are provided with customary hand-wheels for turning them.

Fig. 4 shows a modification, in which the keel-wedge B is operated by a screw, H, and, in order that the horizontal motion of the wedge may not be accompanied by a vertical movement, which would necessitate an inclination of the screw or complicate the connection, the chock A' is superposed and arranged to move vertically in suitable guides, or held against backward longitudinal motion by pawls I, which admit of all said chocks being set promptly up approximately to their bearings by independent movement, which may be imparted by chains or any simple appliance preparatory to the application of the screw or rack gearing. For actuating the keel-wedges B, as shown in Fig. 4, a single longitudinal screw, common to all, or separate screws, may be employed, said screw or screws being rotated by one or more transverse shafts, J, extending beyond the side of the vessel and rotated by vertical shafts, after the manner illustrated in Fig. 3, in connection with the bilge-blocks now to be described.

The wedge-shaped bilge-blocks K (shown in Fig. 3) are operated independently by transverse screws L, rotated by vertical shafts M through the medium of beveled pinions N.

In the modification shown in Fig. 5 longitudinal pinion-shafts O are employed, the pinions *o* of which gear with racks P on the wedge-shaped bilge-blocks K, the longitudinal shafts O being rotated by transverse shafts Q, having either worm or pinion connection with said longitudinal shafts, and themselves rotated by vertical shafts M', as already described.

Where pawls are employed to hold the wedges or chocks up to their work simple appliances are used for withdrawing said pawls simultaneously when the wedges are to be retracted.

I do not claim tackle and pulleys, endless chains, and windlasses, because I am aware that such means have been used heretofore. These devices are not adapted to my invention, where the power is applied through positive connections.

Having thus described my invention, what I claim as new therein, and desire to secure by Letters Patent, is—

The combination, in a ship's cradle or dry-dock, of a system of wedges or inclined chocks, and racks and pinions or screws, and positive mechanical means for operating the same for forcing the said wedges or chocks up in contact with the ship's bottom, substantially as described.

JAS. B. EADS.

Witnesses:
OCTAVIUS KNIGHT,
HARRY E. KNIGHT.